US012664960B2

(12) United States Patent
Luo et al.

(10) Patent No.: US 12,664,960 B2
(45) Date of Patent: Jun. 23, 2026

(54) DISPLAY DEVICE AND IMAGING CONTROL METHOD OF DISPLAY DEVICE

(71) Applicant: HUAWEI TECHNOLOGIES CO., LTD., Shenzhen (CN)

(72) Inventors: Kun Luo, Shenzhen (CN); Cuiping Zhang, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 19/022,999

(22) Filed: Jan. 15, 2025

(65) Prior Publication Data

US 2025/0157438 A1 May 15, 2025

Related U.S. Application Data

(63) Continuation of application No. PCT/CN2023/112692, filed on Aug. 11, 2023.

(30) Foreign Application Priority Data

Aug. 15, 2022 (CN) ......................... 202210974425.7

(51) Int. Cl.
*G09G 5/391* (2006.01)
*G09G 3/3208* (2016.01)
*G09G 5/38* (2006.01)

(52) U.S. Cl.
CPC ........... *G09G 5/391* (2013.01); *G09G 3/3208* (2013.01); *G09G 5/38* (2013.01); *G09G 2340/0407* (2013.01)

(58) Field of Classification Search
CPC ...................................................... G09G 5/391
See application file for complete search history.

(56) References Cited

U.S. PATENT DOCUMENTS

| | | | |
|---|---|---|---|
| 10,700,048 B2 | 6/2020 | Zhang et al. | |
| 2020/0280739 A1* | 9/2020 | Fitzgerald | G06F 3/015 |

FOREIGN PATENT DOCUMENTS

| | | |
|---|---|---|
| CN | 106385575 A | 2/2017 |
| CN | 106507075 A | 3/2017 |

(Continued)

OTHER PUBLICATIONS

Publication CN 106385575 A, machine translation (Year: 2025).*

(Continued)

*Primary Examiner* — Gustavo Polo
(74) *Attorney, Agent, or Firm* — Fish & Richardson P.C.

(57) ABSTRACT

The present disclosure relates to display devices and imaging control methods of a display device. One example display device includes a display, a lens assembly, a driver, and a controller. The controller is configured to convert a first image into n consecutive second images, and generate a drive signal used to control the driver to move, where an image resolution of the second image is less than an image resolution of the first image, a refresh rate of the second image is greater than a refresh rate of the first image, and n≥2. The driver is configured to drive, under control of the drive signal, at least one optical element or the display connected to the driver to move to adjust a display location of the second image displayed by the display, so that the n consecutive second images are displayed at n different locations.

20 Claims, 5 Drawing Sheets

(56) References Cited

FOREIGN PATENT DOCUMENTS

| | | | |
|---|---|---|---|
| CN | 107529048 | A | 12/2017 |
| CN | 109976079 | A | 7/2019 |
| CN | 113490873 | A | 10/2021 |

OTHER PUBLICATIONS

International Search Report and Written Opinion in International Appln. No. PCT/CN2023/112692, mailed on Oct. 26, 2023, 10 pages (with partial English translation).

* cited by examiner

DISPLAY DEVICE AND IMAGING CONTROL METHOD OF DISPLAY DEVICE

CROSS-REFERENCE TO RELATED APPLICATIONS

This application is a continuation of International Application No. PCT/CN2023/112692, filed on Aug. 11, 2023, which claims priority to Chinese Patent Application No. 202210974425.7, filed on Aug. 15, 2022. The disclosures of the aforementioned applications are hereby incorporated by reference in their entireties.

TECHNICAL FIELD

This application relates to the field of display technologies, and in particular, to a display device and an imaging control method of a display device.

BACKGROUND

With evolution of advanced technologies such as a display technology, a communication technology, a chip, and an algorithm, augmented reality (AR) display devices are gradually widely used in a plurality of fields. For example, the AR display devices may be used in many fields such as industries, training, education, movie watching, medical care, and gaming. The AR display devices are expected to become next-generation information exchange terminals after personal computers and smartphones, and have a broad market scale and imagination space.

The AR display devices use a display technology in which real-world information is collected in real time and virtual information, images, and the like are combined with the real world. In terms of information display, the AR display devices are no longer limited to physical screens, but can perform display in entire physical space, and can display the virtual information in real time based on physical entities in a virtual-real combination manner. In terms of human-machine interaction, instruction collection of the AR display devices may break through operation interfaces of entities, and enable, in a more natural and convenient interaction manner such as a voice, a gesture, and an image, a human-machine interaction mode to be more like natural communication with a person.

Compared with communication, big data, software algorithms, and the like, hardware performance of the AR display devices at a current stage restricts rapid development of an AR display technology to some extent. In a related technology, it is difficult for the AR display devices to have performance of a high display resolution, a small volume, and low power consumption.

SUMMARY

Embodiments of this application provide a display device and an imaging control method of a display device, so that an augmented reality display device can have performance of a high display resolution, a small volume, and low power consumption.

According to a first aspect, an embodiment of this application provides a display device. The display device may include a display module, a lens assembly located on an optical path of the display module, a drive component, and a control component. The lens assembly may include at least one optical element. For example, the optical element may be a convex lens or a concave lens. During specific implementation, types and a quantity of optical elements in the lens assembly may be set according to an actual requirement. This is not limited herein. In a possible implementation, the drive component may be an electronically controlled movable apparatus. For example, the drive component may be a voice coil motor. Certainly, the drive component may alternatively be another electronically controlled movable apparatus. This is not limited herein.

The control component is configured to receive a first image to be displayed, convert the first image into n consecutive second images, and generate a drive signal used to control the drive component to move, where an image resolution of the second image is less than an image resolution of the first image, a refresh rate of the second image is greater than a refresh rate of the first image, $n \geq 2$, and n is an integer. The display module is configured to display the n consecutive second images in a time-division manner under control of the control component. The drive component is connected to the at least one optical element in the lens assembly. For example, the drive component may be connected to the entire lens assembly, or the drive component may be connected to a part of optical elements in the lens assembly. Alternatively, the drive component may be connected to the display module. The drive component is configured to drive, under control of the drive signal, a component connected to the drive component to move, to adjust a display location of the second image displayed by the display module, so that the n consecutive second images are displayed at n different locations.

In the display device provided in this embodiment of this application, the control component may convert the first image to be displayed into the n consecutive second images with a lower image resolution, and generate the drive signal used to control the drive component to move, and the refresh rate of the second image is greater than the refresh rate of the first image. In a display process, the drive component may drive, under control of the drive signal, the component connected to the drive component to move, to adjust the display location of the second image displayed by the display module, so that the n consecutive second images are displayed at the n different locations. The second images displayed at the n different locations are superimposed by using persistence of vision and visual synthesis functions of human eyes, so that the human eyes can view a superimposed image whose display resolution is higher than that of the second image, and a high display resolution can be implemented by using a low physical pixel. Therefore, a display resolution of the display device may be increased when a physical resolution of the display module remains unchanged, so that the display device can have performance of a high display resolution, a small volume, and low power consumption.

In some embodiments of this application, the display module may include a plurality of pixels. The drive component is specifically configured to drive, under control of the drive signal, a component connected to the drive component to move, so that a distance between display locations of two adjacent second images is greater than one third of a size of the pixel. In this way, superimposed effect of the n consecutive second images can be better, and the display resolution viewed by the human eyes is higher. For example, a shape of the pixel may be a rectangle, and the size of the pixel may mean a length of a short side or a length of a long side of the pixel. When the shape of the pixel is another shape, the size of the pixel may mean a maximum width, a minimum width, or the like of the pixel in a direction.

During specific implementation, the control component is specifically configured to determine a resolution extension multiple based on the image resolution of the first image and the physical resolution of the display module. For example, the image resolution of the first image is 960p (1280*960), and the physical resolution of the display module is 480p (640*480). It may be determined that the resolution extension multiple is four times. Then, the first image is converted into the n consecutive second images based on the extension multiple, where a quantity of second images converted from each first image is consistent with the extension multiple, that is, the extension multiple is n. In this way, the superimposed effect of displaying the n consecutive second images by the display module at the n different locations is basically consistent with display effect of the first image with a high image resolution, so that the display resolution of the display device is higher than the physical resolution of the display module, and display effect of the display device is better.

In this embodiment of this application, the image resolution of the second image may be less than or equal to the physical resolution of the display module. In this way, the image resolution of the second image can better match the physical resolution of the display module, and display effect of the display module is good. The refresh rate of the second image may be n times the refresh rate of the first image, and the refresh rate of the second image is high, so that after the second images displayed at the different locations are superimposed, the display resolution of the image viewed by the human eyes is higher.

In a possible implementation, the control component is further configured to compare the image resolution of the first image with the physical resolution of the display module; and when the image resolution of the first image is greater than the physical resolution of the display module, convert the first image into the n consecutive second images, and generate the drive signal used to control the drive component to move; or when the image resolution of the first image is less than or equal to the physical resolution of the display module, control the drive component to remain static. In other words, when the image resolution of the first image is less than or equal to the physical resolution of the display module, the physical resolution of the display module is high, the display resolution of the display device does not need to be increased, and the display device may perform display based on the physical resolution of the display module. When the image resolution of the first image is greater than the physical resolution of the display module, the physical resolution of the display module is low, and the display location of the second image displayed by the display module may be adjusted, so that the n consecutive second images are displayed at the n different locations, to increase the display resolution of the display device. Therefore, the display device has a function of changing the display resolution.

In the display device provided in this embodiment of this application, the display module may include at least one display panel, and the display panel may be an active light emitting display panel. Because elements such as a light source, a light uniformity component, and a prism do not need to be additionally disposed on the active light emitting display panel, an internal structure of the display device can be greatly simplified, and a volume of the display device can be reduced. In this embodiment of this application, the display location of the second image displayed by the display module is adjusted, so that the n consecutive second images are displayed at the n different locations, to increase the display resolution of the display device. Therefore, the display resolution of the display device can be increased when the physical resolution of the display module remains unchanged, so that a size of a light emitting pixel on the display panel does not need to be further reduced, light emitting efficiency of the light emitting pixel is not affected, and power consumption of the display module is not increased. Therefore, the display device in this embodiment of this application may have performance of the high display resolution, the small volume, the low power consumption, and high brightness. During specific implementation, the display panel may be an organic light emitting diode (OLED) display panel. For example, the display panel may be a micro organic light emitting diode (micro OLED) display panel. Alternatively, the display panel may be a light emitting diode (LED) display panel. For example, the display panel may be a micro light emitting diode (micro LED) display panel. Certainly, the display panel may alternatively be another active light emitting display panel. This is not limited herein.

In a possible implementation, a light emitting surface of each display panel in the display module faces the lens assembly. During specific implementation, the display module may include only one display panel, and a light emitting surface of the display panel faces the lens assembly. Certainly, in some cases, the display module may alternatively include two or more display panels, and a light emitting surface of each display panel faces the lens assembly. A quantity of display panels in the display module is not limited herein. In a possible implementation, the display panel may be a monochrome display panel, that is, colors of light emitted by all light emitting units in the display panel are the same. In another possible implementation, the display panel may be a full-color display panel. For example, the display panel may include a red light emitting unit, a green light emitting unit, and a blue light emitting unit.

In some embodiments of this application, the display module may include a first display panel, a second display panel, a third display panel, and a light combining element. The light combining element may include a first light incident surface, a second light incident surface, a third light incident surface, and a light output surface. A light emitting surface of the first display panel faces the first light incident surface, a light emitting surface of the second display panel faces the second light incident surface, a light emitting surface of the third display panel faces the third light incident surface, the light output surface faces the lens assembly, and colors of light emitted by the first display panel, light emitted by the second display panel, and light emitted by the third display panel are different. For example, the first display panel, the second display panel, and the third display panel emit red light, green light, and blue light respectively. The light combining element is configured to combine the light emitted by the first display panel, the light emitted by the second display panel, and the light emitted by the third display panel, and transmit combined light to the lens assembly. The first display panel, the second display panel, and the third display panel are all monochrome display panels, and a manufacturing process is simple. In addition, full-color display can be implemented by combining the light emitted by the first display panel, the light emitted by the second display panel, and the light emitted by the third display panel by the light combining element.

According to a second aspect, an embodiment of this application further provides an imaging control method of a display device. The display device in this embodiment of this application may include a display module, a lens assembly located on an optical path of the display module, a drive component, and a control component. The lens assembly may include at least one optical element. The drive component is connected to the at least one optical element in the lens assembly, or the drive component is connected to the display module. For a specific implementation of the display device in the second aspect, refer to the embodiment in the first aspect for implementation. Details are not described again.

The imaging control method in this embodiment of this application may include:

The control component receives a first image to be displayed, converts the first image into n consecutive second images, and generates a drive signal used to control the drive component to move, where an image resolution of the second image is less than an image resolution of the first image, a refresh rate of the second image is greater than a refresh rate of the first image, $n \geq 2$, and n is an integer.

The display module displays the n consecutive second images in a time-division manner under control of the control component.

The drive component drives, under control of the drive signal, a component connected to the drive component to move, to adjust a display location of the second image displayed by the display module, so that the n consecutive second images are displayed at n different locations.

In the imaging control method provided in this embodiment of this application, the control component may convert the first image to be displayed into the n consecutive second images with a lower image resolution, and generate the drive signal used to control the drive component to move, and the refresh rate of the second image is greater than the refresh rate of the first image. In a display process, the drive component may drive, under control of the drive signal, the component connected to the drive component to move, to adjust the display location of the second image displayed by the display module, so that the n consecutive second images are displayed at the n different locations. The second images displayed at the n different locations are superimposed by using persistence of vision and visual synthesis functions of human eyes, so that the human eyes can view a superimposed image whose display resolution is higher than that of the second image, and a high display resolution can be implemented by using a low physical pixel. Therefore, a display resolution of the display device may be increased when a physical resolution of the display module remains unchanged, so that the display device can have performance of a high display resolution, a small volume, and low power consumption.

REFERENCE NUMERALS

Figure 1:
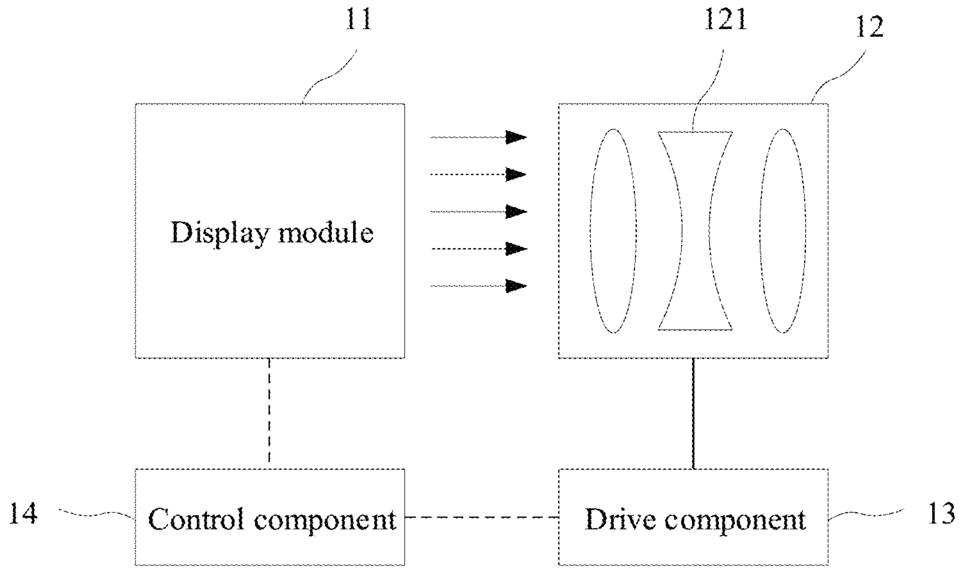
FIG. 1 is a diagram of a structure of a display device according to an embodiment of this application.

11: display module; 11*a*: light emitting unit; 111: first display panel; 112: second display panel; 113: third display panel; 114: light combining element; 12: lens assembly; 121: optical element; 13: drive component; 14: control component; S1: first light incident surface; S2: second light incident surface; S3: third light incident surface; and S4: light output surface.

DESCRIPTION OF EMBODIMENTS

To make the objectives, technical solutions, and advantages of this application clearer, the following further describes this application in detail with reference to the accompanying drawings.

It should be noted that identical reference numerals in the accompanying drawings of this application denote identical or similar structures. Therefore, repeated descriptions thereof are omitted. Words for expressing positions and directions in this application are described by using the accompanying drawings as examples. However, changes may be made as required, and all changes shall fall within the protection scope of this application. The accompanying drawings in this application are merely used to show a relative positional relationship, and do not represent a true scale.

With evolution of advanced technologies such as a display technology, a communication technology, a chip, and an algorithm, augmented reality (AR) display devices are gradually widely used in a plurality of fields. For the AR display device, a higher display resolution can improve user experience. In addition, in many application scenarios of the AR display device, for example, when the AR display device is used in a head-mounted display field, the AR display device further needs to have performance of a small volume and a long battery life.

In a related technology, an active light emitting display module may be used as an image source of the AR display device, and an image displayed by the display module is projected through a lens assembly, so that augmented reality display can be implemented. Because elements such as a light source, a light uniformity component, and a prism do not need to be additionally disposed, an internal structure of the AR display device can be greatly simplified, and a volume of the AR display device can be reduced. However, there is a need to ensure that a size of the display module is small, to ensure that an overall volume of the AR display device is small. To ensure that the AR display device has a high display resolution, a size of a light emitting pixel on the display module needs to be reduced. However, reducing the size of the light emitting pixel greatly reduces light emitting efficiency. In one aspect, power consumption of the display module is greatly increased, and maximum brightness is greatly reduced. In another aspect, a heat emitting phenomenon of the display module is also serious, and difficulty in heat dissipation of the display module and the entire AR display device is further increased. In addition, to implement good drive effect, it is also very difficult to design a display drive circuit in the display module.

In conclusion, in the related technology, it is difficult for the AR display device to have performance of the high display resolution, the small volume, and low power consumption.

Based on this, to enable the augmented reality display device to have performance of a high display resolution, a small volume, and low power consumption. Embodiments of this application provide a display device and an imaging control method of a display device. The display device may be an augmented reality (AR) display device. Certainly, the display device may alternatively be another near-eye display device. This is not limited herein.

FIG. 1 is a diagram of a structure of a display device according to an embodiment of this application. As shown in FIG. 1, the display device provided in this embodiment of this application may include a display module 11, a lens assembly 12 located on an optical path of the display module 11, a drive component 13, and a control component 14. The lens assembly 12 may include at least one optical element 121. For example, the optical element 121 may be a convex lens or a concave lens. During specific implementation, types and a quantity of optical elements 121 in the lens assembly 12 may be set according to an actual requirement. This is not limited herein. In a possible implementation, the drive component 13 may be an electrically controlled movable apparatus. For example, the drive component 13 may be a voice coil motor. Certainly, the drive component 13 may alternatively be another electrically controlled movable apparatus. This is not limited herein.

The control component 14 is configured to receive a first image to be displayed, convert the first image into n consecutive second images, and generate a drive signal used to control the drive component 13 to move, where an image resolution of the second image is less than an image resolution of the first image, a refresh rate of the second image is greater than a refresh rate of the first image, $n \geq 2$, and n is an integer. The display module 11 is configured to display the n consecutive second images in a time-division manner under control of the control component 14. The drive component 13 is connected to the at least one optical element 121 in the lens assembly 12. For example, in the display device shown in FIG. 1, the drive component 13 may be connected to the entire lens assembly 12, or the drive component 13 may be connected to a part of optical elements 121 in the lens assembly 12. Alternatively, the drive component 13 may be connected to the display module 11. The drive component 13 is configured to drive, under control of the drive signal, a component connected to the drive component 13 to move, to adjust a display location of the second image displayed by the display module 11, so that the n consecutive second images are displayed at n different locations.

In the display device provided in this embodiment of this application, the control component may convert the first image to be displayed into the n consecutive second images with a lower image resolution, and generate the drive signal used to control the drive component to move, and the refresh rate of the second image is greater than the refresh rate of the first image. In a display process, the drive component may drive, under control of the drive signal, the component connected to the drive component to move, to adjust the display location of the second image displayed by the display module, so that the n consecutive second images are displayed at the n different locations. The second images displayed at the n different locations are superimposed by using persistence of vision and visual synthesis functions of human eyes, so that the human eyes can view a superimposed image whose display resolution is higher than that of the second image, and a high display resolution can be implemented by using a low physical pixel. Therefore, a display resolution of the display device may be increased when a physical resolution of the display module remains unchanged, so that the display device can have performance of a high display resolution, a small volume, and low power consumption.

There are a plurality of implementations of the display device in this embodiment of this application. The following describes in detail the implementations of the display device in this embodiment of this application with reference to the accompanying drawings.

As shown in FIG. 1, in a possible implementation, the drive component 13 may be connected to the entire lens assembly 12. In other words, each optical element 121 in the lens assembly 12 may move under driving of the drive component 13. During specific implementation, the entire lens assembly 12 may be connected to the drive component 13 by using a mechanical part. The control component 14 is connected to the display module 11 by using an electrical signal, to transmit the second image to the display module 11. The control component 14 is connected to the drive component 13 by using an electrical signal, to transmit the drive signal to the drive component 13. For ease of distinguishing, in FIG. 1, a thick solid line represents a fixed connection relationship between the drive component 13 and the lens assembly 12, and a dashed line represents an electrical signal connection relationship between the control component 14 and the display module 11 (or the drive component 13).

Figure 2:
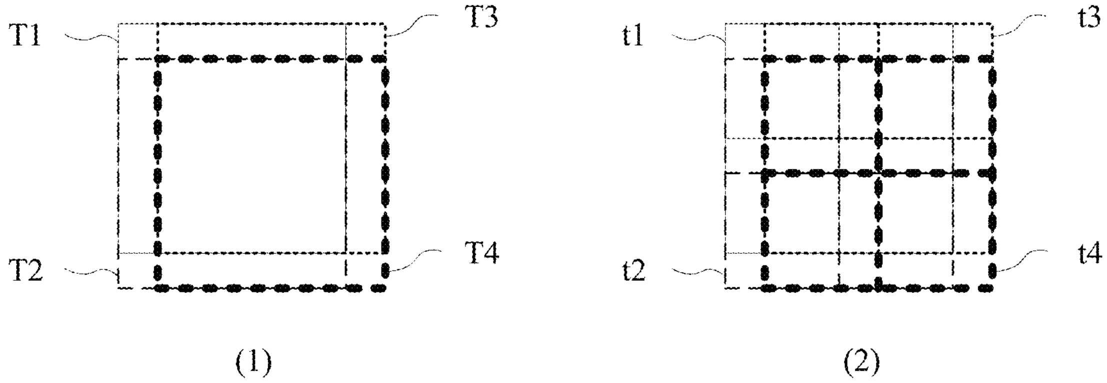
FIG. 2 is a diagram of a display principle of the display device shown in FIG. 1.

FIG. 2 is a diagram of a display principle of the display device shown in FIG. 1. (1) in FIG. 2 shows locations of the lens module at different moments in a display process. Boxes shown in T1 to T4 in the figure represent the lens module. To facilitate distinguishing of the locations of the lens module at the different moments, different line types in the figure represent the locations of the lens module at the different moments. (2) in FIG. 2 shows display locations of second images at different moments in the display process. Large boxes shown in t1 to t4 in the figure represent the second images. To facilitate distinguishing of the display locations of the second images at the different moments, different line types in the figure represent the display locations of the second images at the different moments, and a small box in the large box in the figure represents one display pixel. For ease of illustration, an example in which each second image has 2*2 pixels is used for illustration, does not represent an actual quantity of pixels in the second image.

With reference to FIG. 1 and FIG. 2, the control component 14 may convert the received first image into the n consecutive second images. An example in which n is equal to 4, the image resolution of the first image is 960p (1280*960), and the refresh rate is 60 Hz is used. The first image may be converted into four consecutive second images whose image resolution is 480p (640*480) and refresh rate is 240 Hz. In the display process, the drive component 13 drives, under control of the drive signal, the entire lens assembly 12 to move, so that locations of the lens assembly 12 at different moments are different. For example, in (1) in FIG. 2, the lens assembly 12 is at a location shown by T1 at a first moment, the lens assembly 12 is at a location shown by T2 at a second moment, the lens assembly 12 is at a location shown by T3 at a third moment, the lens assembly 12 is at a location shown by T4 at a fourth moment, and a location of the display module 11 remains unchanged at the first moment to the fourth moment. The display location of the second image displayed by the display module 11 may be adjusted by driving the lens assembly 12 to move, so that light emitted by the display module 11 is displayed at different locations after passing through the lens assembly 12. For example, in (2) in FIG. 2, the second image is displayed at a location shown by t1 at the first moment, the second image is displayed at a location shown by t2 at the second moment, the second image is displayed at a location shown by t3 at the third moment, and the second image is displayed at a location shown by t4 at the fourth moment. Images at four different locations displayed at different moments are superimposed by using persistence of vision and visual synthesis functions of human eyes, and the human eyes view integral effect of the second images displayed at the four different locations, that is, a display resolution of the image viewed by the human eyes is higher than the image resolution of the second image.

Figure 3:
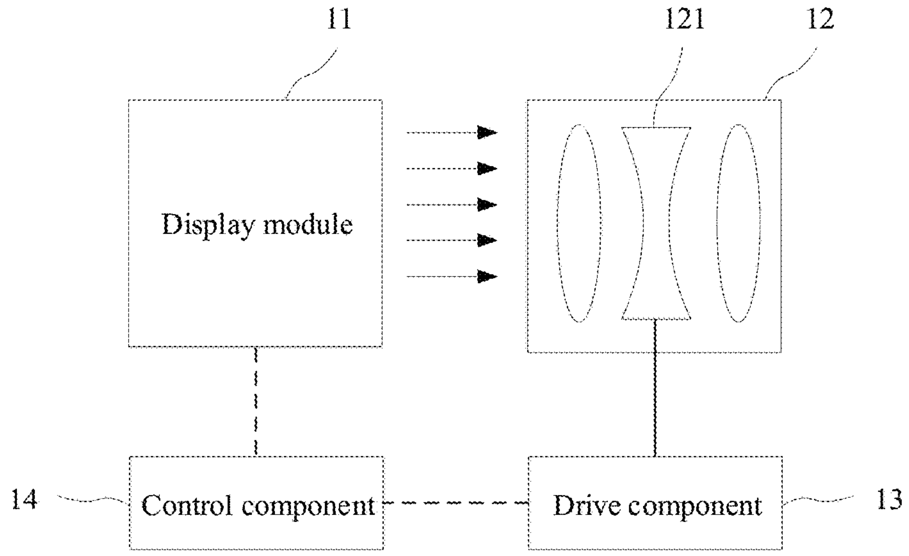
FIG. 3 is a diagram of another structure of a display device according to an embodiment of this application.

FIG. 3 is a diagram of another structure of a display device according to an embodiment of this application. As shown in FIG. 3, in another possible implementation, a drive component 13 may be connected to a part of optical elements 121 in a lens assembly 12. For example, the drive component 13 is connected to one optical element 121 in the lens assembly 12 in FIG. 3. During specific implementation, the drive component 13 may alternatively be connected to two or more optical elements 121 in the lens assembly 12, which may be set according to an actual requirement. Each optical element 121, in the lens assembly 12, connected to the drive component 13 may move under driving of the drive component 13. During actual application, a part of optical elements 121 in the lens assembly 12 may be connected to the drive component 13 by using a mechanical part. In FIG. 3, a thick solid line represents a fixed connection relationship between the drive component 13 and the optical element 121, and a dashed line represents an electrical signal connection relationship between a control component 14 and a display module 11 (or the drive component 13).

Figure 4:
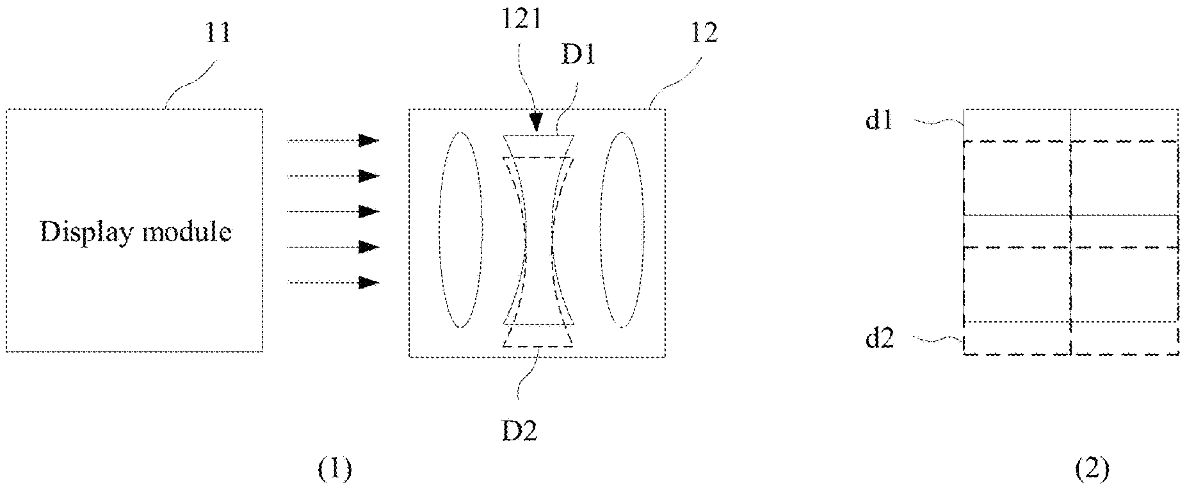
FIG. 4 is a diagram of a display principle of the display device shown in FIG. 3.

FIG. 4 is a diagram of a display principle of the display device shown in FIG. 3. (1) in FIG. 4 shows locations of the optical element at different moments in a display process, and graphs shown by D1 and D2 in the figure represent the optical element 121 connected to the drive component. (2) in FIG. 4 shows display locations of second images at different moments in the display process. Large boxes shown by d1 and d2 in the figure represent the second images, and a small box in the large box in the figure represents one display pixel. For ease of illustration, an example in which each second image has 2*2 pixels is used for illustration, and does not represent an actual quantity of pixels in the second image.

With reference to FIG. 3 and FIG. 4, the control component 14 may convert a received first image into n consecutive second images. For example, n may be equal to 2, an image resolution of the second image is less than an image resolution of the first image, and a refresh rate of the second image is greater than a refresh rate of the first image. In the display process, the drive component 13 drives, under control of a drive signal, the optical element 121 connected to the drive component 13 to move, so that locations of the optical element 121 at different moments are different. For example, in (1) in FIG. 4, the optical element 121 is at a location shown by D1 at a first moment, the optical element 121 is at a location shown by D2 at a second moment, and a location of the display module 11 remains unchanged at the first moment and the second moment. The display location of the second image displayed by the display module 11 may be adjusted by driving the optical element 121 to move. For example, in (2) in FIG. 4, the second image is displayed at a location shown by d1 at the first moment, and the second image is displayed at a location shown by d2 at the second moment. Images at two different locations displayed at different moments are superimposed by using persistence of vision and visual synthesis functions of human eyes, and the human eyes view integral effect of the second images displayed at the two different locations, in other words, a display resolution of the image viewed by the human eyes is higher than the image resolution of the second image.

Figure 5:
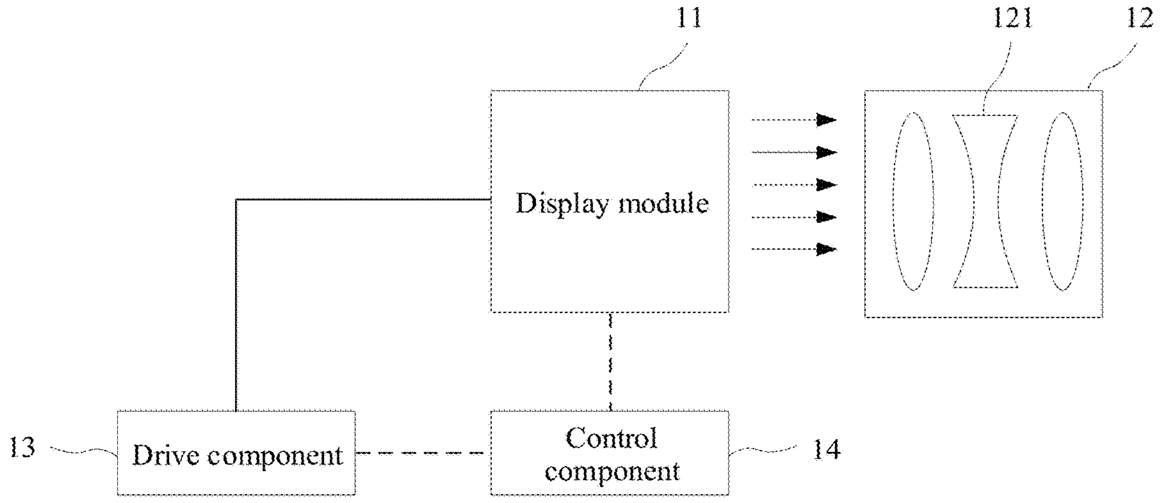
FIG. 5 is a diagram of another structure of a display device according to an embodiment of this application.

FIG. 5 is a diagram of another structure of a display device according to an embodiment of this application. As shown in FIG. 5, in another possible implementation, a drive component 13 may be connected to a display module 11. For example, the display module 11 may be connected to the drive component 13 by using a mechanical part, and the display module 11 may move under driving of the drive component 13. In FIG. 5, a thick solid line represents a fixed connection relationship between the drive component 13 and the display module 11, and a dashed line represents an electrical signal connection relationship between a control component 14 and the display module 11 (or the drive component 13).

Figure 6:
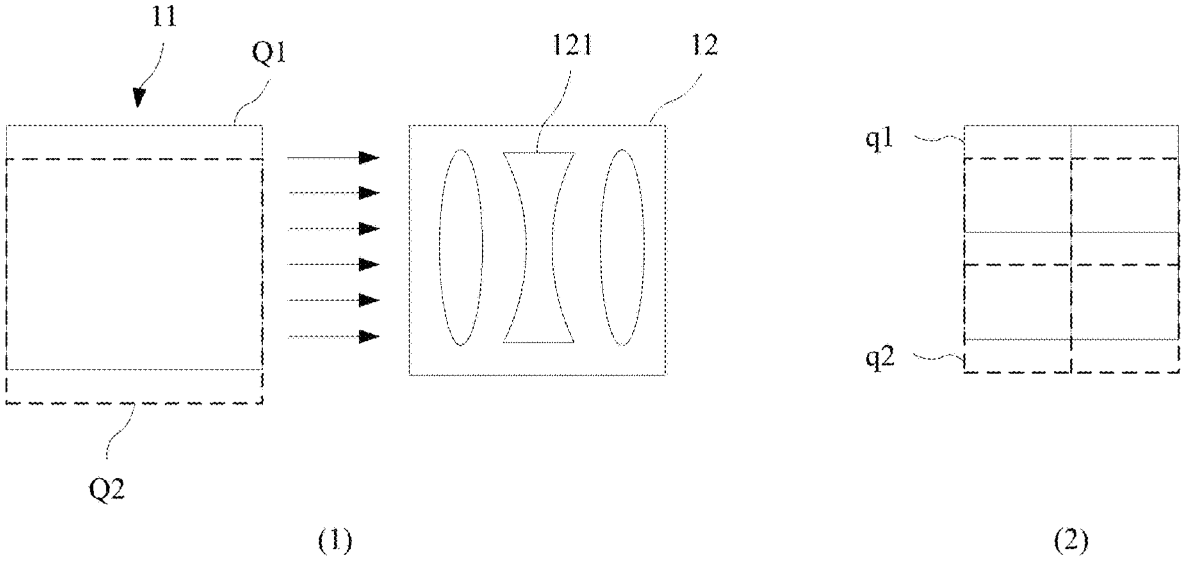
FIG. 6 is a diagram of a display principle of the display device shown in FIG. 5.

FIG. 6 is a diagram of a display principle of the display device shown in FIG. 5. (1) in FIG. 6 shows locations of the display module at different moments in a display process, and Q1 and Q2 in the figure represent the locations of the display module 11 at the different moments. (2) in FIG. 6 shows display locations of second images at different moments in the display process. Large boxes shown by q1 and q2 in the figure represent the second images, and a small box in the large box in the figure represents one display pixel. For ease of illustration, an example in which each second image has 2*2 pixels is used for illustration, and does not represent an actual quantity of pixels in the second image.

With reference to FIG. 5 and FIG. 6, the control component 14 may convert a received first image into n consecutive second images. For example, n may be equal to 2, an image resolution of the second image is less than an image resolution of the first image, and a refresh rate of the second image is greater than a refresh rate of the first image. In the display process, the drive component 13 drives, under control of a drive signal, the display module 11 to move, so that locations of the display module 11 at different moments are different. For example, in (1) in FIG. 6, the display module 11 is at a location shown by Q1 at a first moment, the display module 11 is at a location shown by Q2 at a second moment, and a location of each optical element 121 in a lens assembly 12 remains unchanged at the first moment and the second moment. The display location of the second image displayed by the display module 11 may be adjusted by driving the display module 11 to move. For example, in (2) in FIG. 6, the second image is displayed at a location shown by q1 at the first moment, and the second image is displayed at a location shown by q2 at the second moment. Images at two different locations displayed at different moments are superimposed by using persistence of vision and visual synthesis functions of human eyes, and the human eyes view integral effect of the second images displayed at the two different locations, in other words, a display resolution of the image viewed by the human eyes is higher than the image resolution of the second image.

The foregoing describes several specific implementations of the display device in embodiments of this application. Specific values of the display resolution, the refresh rate, the quantity of pixels, and the quantity n of second images in the foregoing descriptions are all examples for description. During actual application, specific values of these parameters may be set according to an actual requirement. This is not limited herein.

In some embodiments of this application, the display module may include a plurality of pixels. The drive component is specifically configured to drive, under control of the drive signal, a component connected to the drive component to move, so that a distance between display locations of two adjacent second images is greater than one third of a size of the pixel. In this way, superimposed effect of the n consecutive second images can be better, and the display resolution viewed by the human eyes is higher. For example, a shape of the pixel may be a rectangle, and the size of the pixel may mean a length of a short side or a length of a long side of the pixel. When the shape of the pixel is another shape, the size of the pixel may mean a maximum width, a minimum width, or the like of the pixel in a direction.

During specific implementation, the control component is specifically configured to determine a resolution extension multiple based on the image resolution of the first image and the physical resolution of the display module. For example, the image resolution of the first image is 960p (1280*960), and the physical resolution of the display module is 480p (640*480). It may be determined that the resolution extension multiple is four times. Then, the first image is converted into the n consecutive second images based on the extension multiple, where a quantity of second images converted from each first image is consistent with the extension multiple, that is, the extension multiple is n. In this way, the superimposed effect of displaying the n consecutive second images by the display module at the n different locations is basically consistent with display effect of the first image with a high image resolution, so that the display resolution of the display device is higher than the physical resolution of the display module, and display effect of the display device is better.

In embodiments of this application, the image resolution of the second image may be less than or equal to the physical resolution of the display module. In this way, the image resolution of the second image can better match the physical resolution of the display module, and display effect of the display module is good. The refresh rate of the second image may be n times the refresh rate of the first image, and the refresh rate of the second image is high, so that after the second images displayed at the different locations are superimposed, the display resolution of the image viewed by the human eyes is higher.

In a possible implementation, the control component is further configured to compare the image resolution of the first image with the physical resolution of the display module; and when the image resolution of the first image is greater than the physical resolution of the display module, convert the first image into the n consecutive second images, and generate the drive signal used to control the drive component to move; or when the image resolution of the first image is less than or equal to the physical resolution of the display module, control the drive component to remain static. In other words, when the image resolution of the first image is less than or equal to the physical resolution of the display module, the physical resolution of the display module is high, the display resolution of the display device does not need to be increased, and the display device may perform display based on the physical resolution of the display module. When the image resolution of the first image is greater than the physical resolution of the display module, the physical resolution of the display module is low, and the display location of the second image displayed by the display module may be adjusted, so that the n consecutive second images are displayed at the n different locations, to increase the display resolution of the display device. Therefore, the display device has a function of changing the display resolution.

In the display device provided in embodiments of this application, the display module may include at least one display panel, and the display panel may be an active light emitting display panel. Because elements such as a light source, a light uniformity component, and a prism do not need to be additionally disposed on the active light emitting display panel, an internal structure of the display device can be greatly simplified, and a volume of the display device can be reduced. In embodiments of this application, the display location of the second image displayed by the display module is adjusted, so that the n consecutive second images are displayed at the n different locations, to increase the display resolution of the display device. Therefore, the display resolution of the display device can be increased when the physical resolution of the display module remains unchanged, so that a size of a light emitting pixel on the display panel does not need to be further reduced, light emitting efficiency of the light emitting pixel is not affected, and power consumption of the display module is not increased. Therefore, the display device in this embodiment of this application may have performance of the high display resolution, the small volume, the low power consumption, and high brightness. During specific implementation, the display panel may be an organic light emitting diode (OLED) display panel. For example, the display panel may be a micro organic light emitting diode (micro OLED) display panel. Alternatively, the display panel may be a light emitting diode (LED) display panel. For example, the display panel may be a micro light emitting diode (micro LED) display panel. Certainly, the display panel may alternatively be another active light emitting display panel. This is not limited herein.

Figure 7:
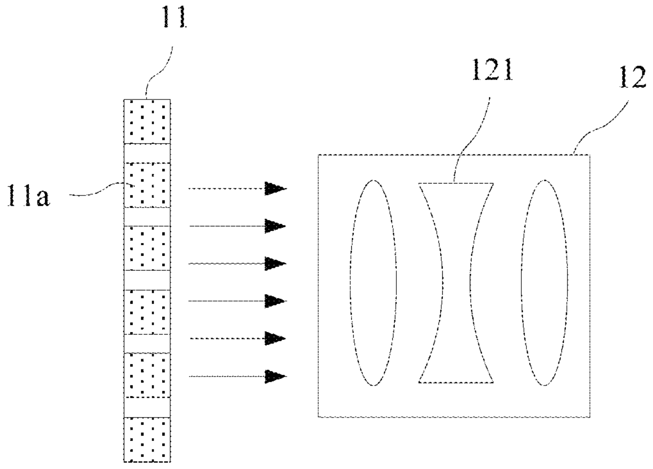
FIG. 7 is a diagram of a simplified structure of a display device according to an embodiment of this application.
Figure 8:
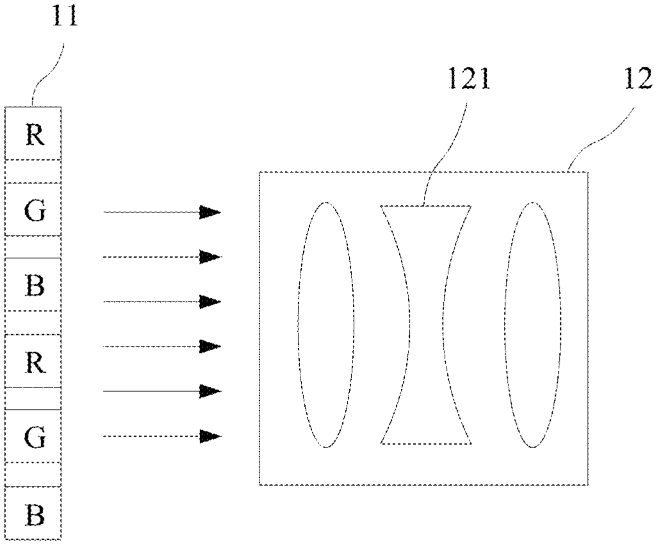
FIG. 8 is a diagram of another simplified structure of a display device according to an embodiment of this application.

FIG. 7 is a diagram of a simplified structure of a display device according to an embodiment of this application. To clearly show a structure of a display module, a drive component and a control component in the display device are omitted in FIG. 7. As shown in FIG. 7, a light emitting surface of each display panel in the display module 11 faces a lens assembly 12. During specific implementation, the display module 11 may include only one display panel, and a light emitting surface of the display panel faces the lens assembly 12. Certainly, in some cases, the display module 11 may alternatively include two or more display panels, and a light emitting surface of each display panel faces the lens assembly 12. A quantity of display panels in the display module 11 is not limited herein. In a possible implementation, the display panel may be a monochrome display panel, that is, colors of light emitted by all light emitting units 11*a* in the display panel are the same. FIG. 8 is a diagram of another simplified structure of a display device according to an embodiment of this application. To clearly show a structure of a display module, a drive component and a control component in the display device are omitted in FIG. 8. As shown in FIG. 8, in another possible implementation, a display panel may be a full-color display panel. For example, the display panel may include a red light emitting unit R, a green light emitting unit G, and a blue light emitting unit B.

Figure 9:
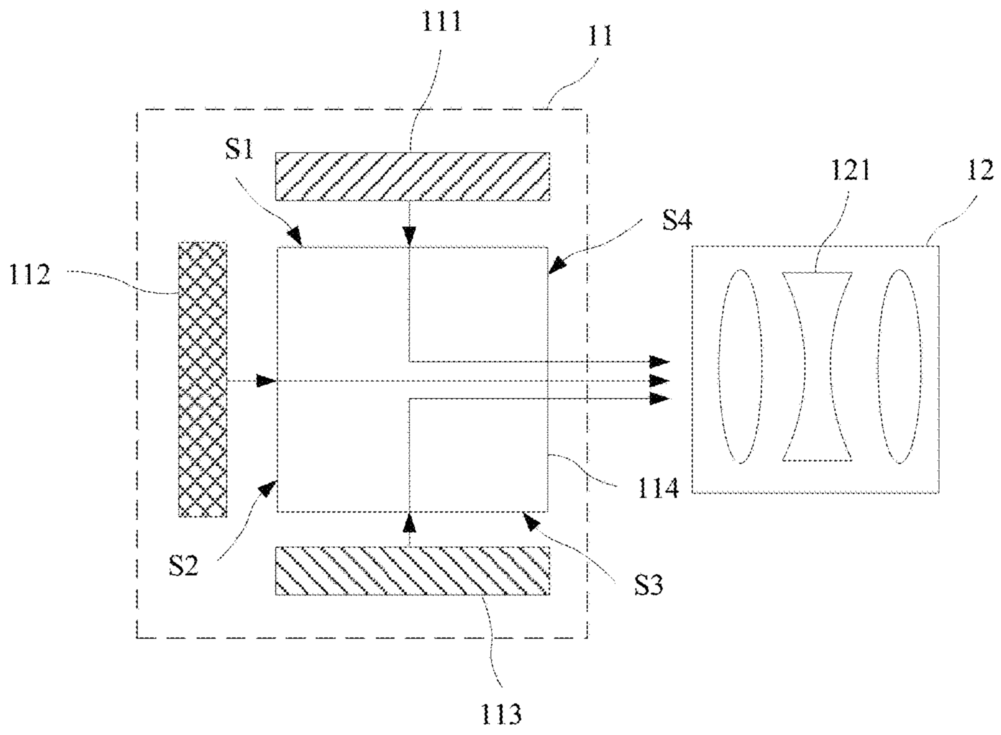
FIG. 9 is a diagram of another simplified structure of a display device according to an embodiment of this application.

FIG. 9 is a diagram of another simplified structure of a display device according to an embodiment of this application. To clearly show a structure of a display module, a drive component and a control component in the display device are omitted in FIG. 9. As shown in FIG. 9, the display module 11 may include a first display panel 111, a second display panel 112, a third display panel 113, and a light combining element 114. The light combining element 114 may include a first light incident surface S1, a second light incident surface S2, a third light incident surface S3, and a light output surface S4. A light emitting surface of the first display panel 111 faces the first light incident surface S1, a light emitting surface of the second display panel 112 faces the second light incident surface S2, a light emitting surface of the third display panel 113 faces the third light incident surface S3, the light output surface S4 faces a lens assembly 12, and colors of light emitted by the first display panel 111, light emitted by the second display panel 112, and light emitted by the third display panel 113 are different. For example, the first display panel 111, the second display panel 112, and the third display panel 113 emit red light, green light, and blue light respectively. The light combining element 114 is configured to combine the light emitted by the first display panel 111, the light emitted by the second display panel 112, and the light emitted by the third display panel 113, and transmit combined light to the lens assembly 12. The first display panel 111, the second display panel 112, and the third display panel 113 are all monochrome display panels, and a manufacturing process is simple. In addition, full-color display can be implemented by combining the light emitted by the first display panel 111, the light emitted by the second display panel 112, and the light emitted by the third display panel 113 by the light combining element 114.

Based on a same technical concept, an embodiment of this application further provides an imaging control method of a display device. As shown in FIG. 1, the display device in this embodiment of this application may include a display module 11, a lens assembly 12 located on an optical path of the display module 11, a drive component 13, and a control component 14. The lens assembly 12 may include at least one optical element 121. The drive component 13 is connected to the at least one optical element 121 in the lens assembly 12, or the drive component 13 is connected to the display module 11. For a specific implementation of the display device in this embodiment, refer to the foregoing embodiments for implementation. Details are not described again.

Figure 10:
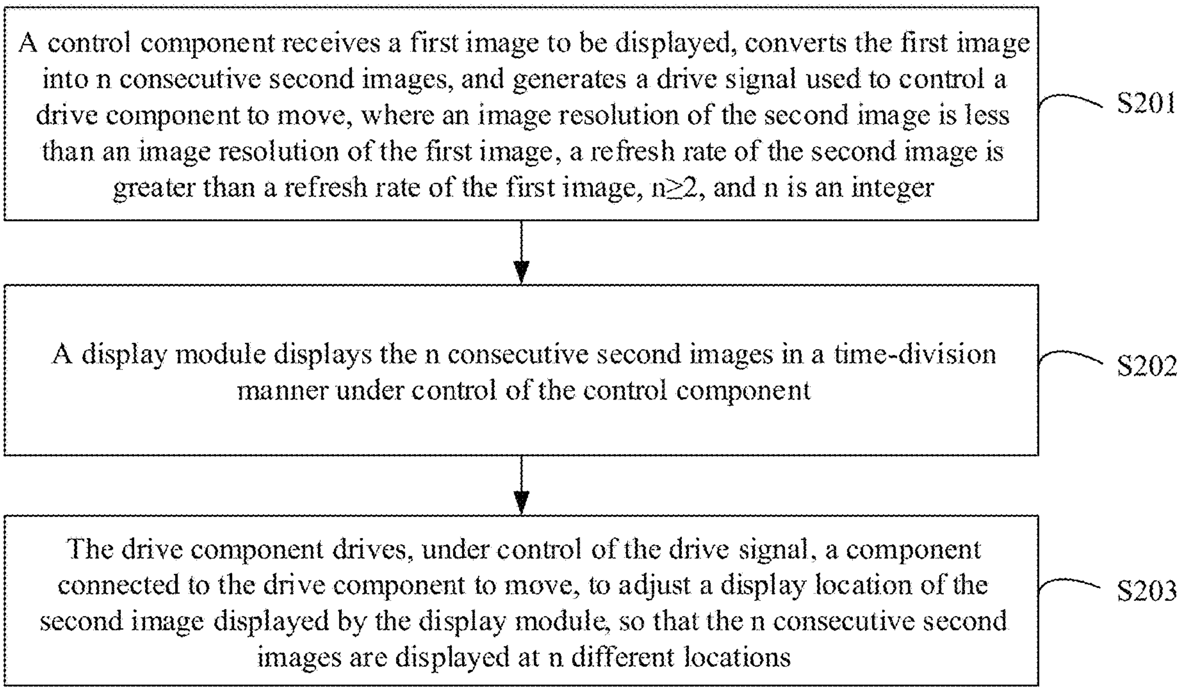
FIG. 10 is a flowchart of an imaging control method according to an embodiment of this application.

FIG. 10 is a flowchart of an imaging control method according to an embodiment of this application. As shown in FIG. 10, the imaging control method in this embodiment of this application may include the following steps.

S201: A control component receives a first image to be displayed, converts the first image into n consecutive second images, and generates a drive signal used to control a drive component to move, where an image resolution of the second image is less than an image resolution of the first image, a refresh rate of the second image is greater than a refresh rate of the first image, n≥2, and n is an integer.

S202: A display module displays the n consecutive second images in a time-division manner under control of the control component.

S203: The drive component drives, under control of the drive signal, a component connected to the drive component to move, to adjust a display location of the second image displayed by the display module, so that the n consecutive second images are displayed at n different locations.

In the imaging control method provided in this embodiment of this application, the control component may convert the first image to be displayed into the n consecutive second images with a lower image resolution, and generate the drive signal used to control the drive component to move, and the refresh rate of the second image is greater than the refresh rate of the first image. In a display process, the drive component may drive, under control of the drive signal, the component connected to the drive component to move, to adjust the display location of the second image displayed by the display module, so that the n consecutive second images are displayed at the n different locations. The second images displayed at the n different locations are superimposed by using persistence of vision and visual synthesis functions of human eyes, so that the human eyes can view a superimposed image whose display resolution is higher than that of the second image, and a high display resolution can be implemented by using a low physical pixel. Therefore, a display resolution of the display device may be increased when a physical resolution of the display module remains unchanged, so that the display device can have performance of a high display resolution, a small volume, and low power consumption.

In some embodiments of this application, the display module may include a plurality of pixels.

Step S203 may specifically include:

The drive component drives, under control of the drive signal, the component connected to the drive component to move, so that a distance between display locations of two adjacent second images is greater than one third of a size of the pixel.

In this way, superimposed effect of the n consecutive second images may be better, and the display resolution viewed by the human eyes is higher. For example, a shape of the pixel may be a rectangle, and the size of the pixel may mean a length of a short side or a length of a long side of the pixel. When the shape of the pixel is another shape, the size of the pixel may mean a maximum width, a minimum width, or the like of the pixel in a direction.

During specific implementation, in step S201, that a control component converts the first image into n consecutive second images may specifically include:

The control component determines a resolution extension multiple based on the image resolution of the first image and the physical resolution of the display module. For example, the image resolution of the first image is 960p (1280*960), and the physical resolution of the display module is 480p (640*480). It may be determined that the resolution extension multiple is four times. Then, the control component converts the first image into the n consecutive second images based on the extension multiple, where a quantity of second images converted from each first image is consistent with the extension multiple, that is, the extension multiple is n. In this way, the superimposed effect of displaying the n consecutive second images by the display module at the n different locations is basically consistent with display effect of the first image with a high image resolution, so that the display resolution of the display device is higher than the physical resolution of the display module, and display effect of the display device is better.

For example, in step S201, an example in which n is equal to 4, the image resolution of the first image is 960p (1280*960), and the refresh rate is 60 Hz is used. The first image may be converted into four consecutive second images whose image resolution is 480p (640*480) and refresh rate is 240 Hz. In the display process, the drive component 13 drives, under control of the drive signal, the entire lens assembly 12 to move, so that locations of the lens assembly 12 at different moments are different, to increase the display resolution of the display device.

In this embodiment of this application, the image resolution of the second image may be less than or equal to the physical resolution of the display module. In this way, the image resolution of the second image can better match the physical resolution of the display module, and display effect of the display module is good. The refresh rate of the second image may be n times the refresh rate of the first image, and the refresh rate of the second image is high, so that after the second images displayed at the different locations are superimposed, the display resolution of the image viewed by the human eyes is higher.

In a possible implementation, after the control component, receives the first image to be displayed, and before the control component converts the first image into the n consecutive second images, the method may further include:

The control component compares the image resolution of the first image with the physical resolution of the display module.

In step S201, that a control component converts the first image into n consecutive second images specifically includes:

when the image resolution of the first image is greater than the physical resolution of the display module, converting the first image into the n consecutive second images, and generating the drive signal used to control the drive component to move.

The imaging control method may further include:

when the image resolution of the first image is less than or equal to the physical resolution of the display module, controlling the drive component to remain static.

In this way, when the image resolution of the first image is greater than the physical resolution of the display module, the first image is converted into the n consecutive second images, and the drive signal used to control the drive component to move is generated; or when the image resolution of the first image is less than or equal to the physical resolution of the display module, the drive component is controlled to remain static. In other words, when the image resolution of the first image is less than or equal to the physical resolution of the display module, the physical resolution of the display module is high, the display resolution of the display device does not need to be increased, and the display device may perform display based on the physical resolution of the display module. When the image resolution of the first image is greater than the physical resolution of the display module, the physical resolution of the display module is low, and the display location of the second image displayed by the display module may be adjusted, so that the n consecutive second images are displayed at the n different locations, to increase the display resolution of the display device. Therefore, the display device has a function of changing the display resolution.

Although some preferred embodiments of this application have been described, persons skilled in the art can make changes and modifications to these embodiments once they learn of the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. In this case, this application is intended to cover these modifications and variations of embodiments of this application provided that they fall within the scope of protection defined by the following claims and their equivalent technologies.

The invention claimed is:

1. A display device, comprising:

a display;

a lens assembly located on an optical path of the display;

a driver; and a controller, wherein:

the lens assembly comprises at least one optical element;

the controller is configured to receive a first image to be displayed, convert the first image into n consecutive second images, and generate a drive signal used to control the driver to move, wherein an image resolution of the second image is less than an image resolution of the first image, a refresh rate of the second image is greater than a refresh rate of the first image, n≥2, and n is an integer based on the image resolution of the first image and a physical resolution of the display;

the display is configured to display the n consecutive second images in a time-division manner under control of the controller;

the driver is connected to the at least one optical element in the lens assembly, or the driver is connected to the display; and the driver is configured to drive, under control of the drive signal, a component connected to the driver to move to adjust a display location of the second image displayed by the display, wherein the n consecutive second images are displayed at n different locations.

2. The display device according to claim 1, wherein the display comprises a plurality of pixels; and wherein the driver is configured to drive, under control of the drive signal, the component connected to the driver to move, and a distance between display locations of two adjacent second images is greater than one third of a size of a pixel.

3. The display device according to claim 1, wherein the controller is configured to:

determine a resolution extension multiple based on the image resolution of the first image and the physical resolution of the display; and convert the first image into the n consecutive second images based on the extension multiple, wherein a quantity of second images converted from each first image is consistent with the extension multiple.

4. The display device according to claim 1, wherein the image resolution of the second image is less than or equal to the physical resolution of the display, and the refresh rate of the second image is n times the refresh rate of the first image.

5. The display device according to claim 4, wherein the controller is further configured to:

compare the image resolution of the first image with the physical resolution of the display; and when the image resolution of the first image is greater than the physical resolution of the display, convert the first image into the n consecutive second images, and generate the drive signal used to control the driver to move; or when the image resolution of the first image is less than or equal to the physical resolution of the display, control the driver to remain static.

6. The display device according to claim 1, wherein the display comprises at least one display panel, and each of the at least one display panel is an organic light emitting diode display panel or a light emitting diode display panel.

7. The display device according to claim 6, wherein a light emitting surface of each of the at least one display panel faces the lens assembly.

8. The display device according to claim 6, wherein:

the at least one display panel comprises a first display panel, a second display panel, and a third display panel;

the display further comprises a light combining element;

the light combining element comprises a first light incident surface, a second light incident surface, a third light incident surface, and a light output surface;

a light emitting surface of the first display panel faces the first light incident surface, a light emitting surface of the second display panel faces the second light incident surface, a light emitting surface of the third display panel faces the third light incident surface, the light output surface faces the lens assembly, and colors of light emitted by the first display panel, light emitted by the second display panel, and light emitted by the third display panel are different; and the light combining element is configured to combine the light emitted by the first display panel, the light emitted by the second display panel, and the light emitted by the third display panel, and transmit the combined light to the lens assembly.

9. An imaging control method of a display device, wherein the display device comprises a display, a lens assembly located on an optical path of the display, a driver, and a controller, wherein the lens assembly comprises at least one optical element, and the driver is connected to the at least one optical element in the lens assembly, or the driver is connected to the display; and wherein the imaging control method comprises:

receiving, by the controller, a first image to be displayed;

converting, by the controller, the first image into n consecutive second images;

generating, by the controller, a drive signal used to control the driver to move, wherein an image resolution of the second image is less than an image resolution of the first image, a refresh rate of the second image is greater than a refresh rate of the first image, n≥2, and n is an integer based on the image resolution of the first image and a physical resolution of the display;

displaying, by the display, the n consecutive second images in a time-division manner under control of the controller; and driving, by the driver under control of the drive signal, a component connected to the driver to move to adjust a display location of the second image displayed by the display, wherein the n consecutive second images are displayed at n different locations.

10. The imaging control method according to claim 9, wherein the display comprises a plurality of pixels; and wherein a distance between display locations of two adjacent second images is greater than one third of a size of a pixel.

11. The imaging control method according to claim 9, wherein converting, by the controller, the first image into the n consecutive second images comprises:

determining, by the controller, a resolution extension multiple based on the image resolution of the first image and the physical resolution of the display; and converting, by the controller, the first image into the n consecutive second images based on the extension multiple, wherein a quantity of second images converted from each first image is consistent with the extension multiple.

12. The imaging control method according to claim 9, wherein the image resolution of the second image is less than or equal to the physical resolution of the display, and the refresh rate of the second image is n times the refresh rate of the first image.

13. The imaging control method according to claim 12, wherein before converting, by the controller, the first image into the n consecutive second images, the method further comprises:

comparing, by the controller, the image resolution of the first image with the physical resolution of the display;

wherein converting, by the controller, the first image into the n consecutive second images comprises:

when the image resolution of the first image is greater than the physical resolution of the display, converting the first image into the n consecutive second images; and generating the drive signal used to control the driver to move.

14. The imaging control method according to claim 12, further comprising:

when the image resolution of the first image is less than or equal to the physical resolution of the display, controlling the driver to remain static.

15. The imaging control method according to claim 9, wherein the display comprises at least one display panel, and each of the at least one display panel is an organic light emitting diode display panel or a light emitting diode display panel.

16. The imaging control method according to claim 15, wherein a light emitting surface of each of the at least one display panel faces the lens assembly.

17. The imaging control method according to claim 15, wherein the at least one display panel comprises a first display panel, a second display panel, and a third display panel.

18. The imaging control method according to claim 17, wherein the display further comprises a light combining element, and the light combining element comprises a first light incident surface, a second light incident surface, a third light incident surface, and a light output surface.

19. The imaging control method according to claim 18, wherein a light emitting surface of the first display panel faces the first light incident surface, a light emitting surface of the second display panel faces the second light incident surface, a light emitting surface of the third display panel faces the third light incident surface, the light output surface faces the lens assembly, and colors of light emitted by the first display panel, light emitted by the second display panel, and light emitted by the third display panel are different.

20. The imaging control method according to claim 19, further comprising:

combining, by the light combining element, the light emitted by the first display panel, the light emitted by the second display panel, and the light emitted by the third display panel; and transmitting, by the light combining element, the combined light to the lens assembly.

* * * * *